(12) United States Patent
Kim et al.

(10) Patent No.: US 10,600,156 B2
(45) Date of Patent: Mar. 24, 2020

(54) IMAGE PROPERTIES-BASED ADAPTIVE FILTERING METHOD AND DEVICE IN IMAGE CODING SYSTEM

(71) Applicant: LG Electronics Inc., Seoul (KR)

(72) Inventors: Chulkeun Kim, Seoul (KR); Junghak Nam, Seoul (KR)

(73) Assignee: LG Electronics Inc., Seoul (KR)

(*) Notice: Subject to any disclaimer, the term of this patent is extended or adjusted under 35 U.S.C. 154(b) by 84 days.

(21) Appl. No.: 15/737,552

(22) PCT Filed: Feb. 2, 2016

(86) PCT No.: PCT/KR2016/001136
§ 371 (c)(1),
(2) Date: Dec. 18, 2017

(87) PCT Pub. No.: WO2016/204373
PCT Pub. Date: Dec. 22, 2016

(65) Prior Publication Data
US 2018/0197276 A1 Jul. 12, 2018

Related U.S. Application Data

(60) Provisional application No. 62/240,541, filed on Oct. 13, 2015, provisional application No. 62/181,731, (Continued)

(51) Int. Cl.
*G06T 5/00* (2006.01)
*H04N 19/117* (2014.01)
(Continued)

(52) U.S. Cl.
CPC ............... *G06T 5/001* (2013.01); *G06T 5/10* (2013.01); *G06T 5/20* (2013.01); *H04N 19/117* (2014.11);
(Continued)

(58) Field of Classification Search
CPC .. G06T 5/001; G06T 5/20; G06T 5/10; H04N 19/70; H04N 19/117; H04N 19/85; H04N 19/82
See application file for complete search history.

(56) References Cited

U.S. PATENT DOCUMENTS 10,063,887 B2 * 8/2018 Nam ................... H04N 19/182
2002/0110269 A1 * 8/2002 Floeder ................. G01N 21/89
382/141
(Continued)

FOREIGN PATENT DOCUMENTS

CN 1717058 1/2006
CN 101127906 2/2008
(Continued)

OTHER PUBLICATIONS

European Search Report in European Appln. No. 16811786.9, dated Jan. 7, 2019, 10 pages.
(Continued)

*Primary Examiner* — John W Lee
(74) *Attorney, Agent, or Firm* — Fish & Richardson P.C.

(57) ABSTRACT

A restoring picture filtering method performed by a decoding device, according to the present invention, comprises the steps of: calculating the activity of an image of a target region of a restoring picture; determining the directivity of the image of the target region; selecting a particular filter within a filter set on the basis of the activity and the directivity; and performing filtering on the restoring picture on the basis of the selected filter. According to the present invention, adaptive filtering may be applied on the basis of image properties of a target block of a restoring picture, and the objective/subjective image quality of the restoring picture may be enhanced therethrough.

14 Claims, 16 Drawing Sheets

Related U.S. Application Data filed on Jun. 18, 2015, provisional application No. 62/181,730, filed on Jun. 18, 2015.

(51) Int. Cl.
- *H04N 19/82* (2014.01)
- *H04N 19/85* (2014.01)
- *H04N 19/70* (2014.01)
- *G06T 5/10* (2006.01)
- *G06T 5/20* (2006.01)

(52) U.S. Cl.
CPC ............ *H04N 19/70* (2014.11); *H04N 19/82* (2014.11); *H04N 19/85* (2014.11)

(56) References Cited

U.S. PATENT DOCUMENTS

| | | | | |
|---|---|---|---|---|
| 2006/0098879 | A1* | 5/2006 | Kim | G09G 3/3611 382/233 |
| 2012/0051438 | A1 | 3/2012 | Chong et al. | |
| 2012/0213271 | A1* | 8/2012 | Chong | H04N 19/96 375/240.02 |
| 2013/0136371 | A1* | 5/2013 | Ikai | H04N 19/593 382/224 |
| 2013/0336393 | A1* | 12/2013 | Matsumura | G06T 5/20 375/240.03 |

FOREIGN PATENT DOCUMENTS

| | | |
|---|---|---|
| CN | 101175208 | 5/2008 |
| CN | 103813176 | 5/2014 |
| EP | 2584781 | 4/2013 |
| JP | H0654303 | 2/1994 |
| KR | 10-2009-0098214 | 9/2009 |
| KR | 10-2011-0036519 | 4/2011 |
| KR | 10-2012-0118782 | 10/2012 |
| KR | 10-2013-0070636 | 6/2013 |
| KR | 10-2014-0065024 | 5/2014 |
| KR | 10-2015-0058528 | 5/2015 |
| WO | 2014094829 | 6/2014 |

OTHER PUBLICATIONS

Qualcomm Inc., "Video coding technology proposal by Qualcomm Inc.", JCTVC-A121, Joint Collaborative Team on Video Coding (JCT-VC) of ITU-T SG16 WP3 and ISO/IEC JTC1/SC29/WG11, Dresden, DE, Apr. 15-23, 2010, 24 pages.

Karczewicz et al., "Video coding technology proposal by Qualcomm Inc.," JCT-VC of ITU-T SG16 WP3 and ISO-IEC JTC1/SC29/WG11, Mar. 2012, 1st meeting, 26 pages.

\* cited by examiner (a)

|  | Horizontal activity 0 | Horizontal activity 1 | Horizontal activity 2 | Horizontal activity 3 | Horizontal activity 4 |
|---|---|---|---|---|---|
| Vertical activity 0 |  |  |  |  |  |
| Vertical activity 1 |  |  |  |  |  |
| Vertical activity 2 |  |  |  |  |  |
| Vertical activity 3 |  |  |  |  |  |
| Vertical activity 4 |  |  |  |  |  |

IMAGE PROPERTIES-BASED ADAPTIVE FILTERING METHOD AND DEVICE IN IMAGE CODING SYSTEM

CROSS-REFERENCE TO RELATED APPLICATIONS

This application is a National Stage application under 35 U.S.C. § 371 of International Application No. PCT/KR2016/001136, filed Feb. 2, 2016, which claims the benefit of U.S. Provisional Application No. 62/240,541, filed on Oct. 13, 2015, U.S. Provisional Application No. 62/181,731, filed on Jun. 18, 2015, and U.S. Provisional Application No. 62/181,730, filed on Jun. 18, 2015. The disclosures of the prior applications are incorporated by reference in their entirety.

BACKGROUND OF THE INVENTION

Field of the Invention

The present invention relates to an image coding technology, and more particularly, to a method and a device of image-properties-based adaptive filtering in an image coding system.

Related Art

The need for images of high resolution and high quality has recently been increasing in various fields. As the resolution and quality of an image is improved, the amount of data in the image is also likewise increased.

Due to the increase in the amount of information, devices with various performance and networks of various environments are emerging. With the emergence of devices with diverse capabilities and networks of diverse environments, it has become possible to use the same content at varying levels of quality.

Specifically, due to the fact that the image quality that the terminal device can support is diversified, and the network environment that is constructed becomes various, in some environments, images of general quality are used, while, in other environments, images of higher quality are available.

For example, a consumer who purchases video content from a mobile terminal may view the same video content on a larger screen and with a higher resolution using a large screen for home use.

In recent years, as broadcasts with HD (High Definition) resolution are being served, many users are already becoming accustomed to high resolution, high quality images, etc. In addition to HDTV, service providers and users are paying attention to UHD (Ultra High Definition) or better services that have more than four times the resolution of HDTVs.

As a result, a restoring picture filtering method for enhancing a subjective/objective image quality is required.

SUMMARY OF THE INVENTION

The present invention provides a method and a device for enhancing image coding efficiency.

The present invention also provides a method and a device for enhancing an objective/subjective image quality of a restoring picture.

The present invention also provides a method and a device for filtering the restoring picture.

The present invention also provides a method and a device for adaptive filtering based on properties of an image.

The present invention also adaptively applies a filter by considering the properties of the image.

In an aspect, a restoring picture filtering method performed by a decoding apparatus is provided. The filtering method includes: calculating the activity of an image of a target region of a restoring picture; determining the directivity of the image of the target region; selecting a particular filter within a filter set on the basis of the activity and the directivity; and performing filtering on the restoring picture on the basis of the selected filter.

The determining of the directivity may include determining the directivity for the sample on the basis of a sample in the target region and four peripheral samples adjacent to the sample, and determining the directivity for the target region based on the directivity for the sample. In this case, the directivity for the sample may be determined on the basis of a vertical change degree and a horizontal change degree for the sample.

Here, the activity of the image for the target region may include horizontal activity and vertical activity.

Here, the determining of the directivity may include determining the directivity for the sample on the basis of the sample in the target region and eight peripheral samples adjacent to the sample, and determining the directivity for the target region based on the directivity for the sample. In this case, the directivity of the image for the target region may indicate one of a horizontal direction, a vertical direction, an upper right diagonal direction, an upper left diagonal direction, and a non-direction.

Here, the size of the target region may be variable.

Here, the filtering method may further include: receiving a variable region size enabled flag; and receiving region size information when a value of the variable region size enabled flag indicates 1. In this case, the size of the target region may be determined on the basis of the region size information. In this case, the region size information may be classified into five values of indexes 0 to 4. In this case, the indexes 0 to 4 may be represented as binarization values "0", "100", "101", "110", and "111", respectively. Herein, the binarization value may be referred to as a Bin value.

Here, the filtering method may further include receiving a diagonal activity enabled flag. When the value of the diagonal activity enabled flag indicates 1, the directivity of the image for the target region may be determined by considering a diagonal direction.

Here, the filter set may be determined on the basis of a resolution of the image. In this case, the filtering method may further include: receiving a variable filter set enabled flag; and receiving at least one of filter coefficient information and filter tap information when the value of the variable filter set enabled flag indicates 1. In this case, the filter set may be determined on the basis of at least one of the filter number information and the filter tap information. Further, the filtering method may further include receiving a variable filter shape enabled flag. In this case, a case where the value of the variable filter shape enabled flag indicates 0 and a case where the value of the variable filter shape enabled flag indicates 1 may be different in shape of the filter indicated by the filter tap information.

In another aspect, a decoding apparatus performing restoring picture filtering is provided. The decoding apparatus includes: a receiving unit receiving at least one of a variable region size enabled flag, a diagonal activity enabled flag, a variable filter set enabled flag, and a variable filter shape enabled flag; and a filter unit calculating activity of an image for a target region of a restoring picture, determining directivity of the image for the target region, selecting a particular filter in a filter set on the basis of the activity and the directivity, and performing filtering for the restoring picture on the basis of the selected filter.

According to the present invention, filtering can be applied based on image properties for a target block of a restoring picture and an objective/subjective image quality for the restoring picture can be thus enhanced. Further, the filtered restoring picture is stored in a memory to be used as a reference picture for another picture and in this case, inter prediction efficiency can be enhanced.

BRIEF DESCRIPTION OF THE DRAWINGS

FIG. 6 illustrates an example of image properties classification through combination of horizontal activity and vertical activity according to an embodiment of the present invention.

Figure 1:
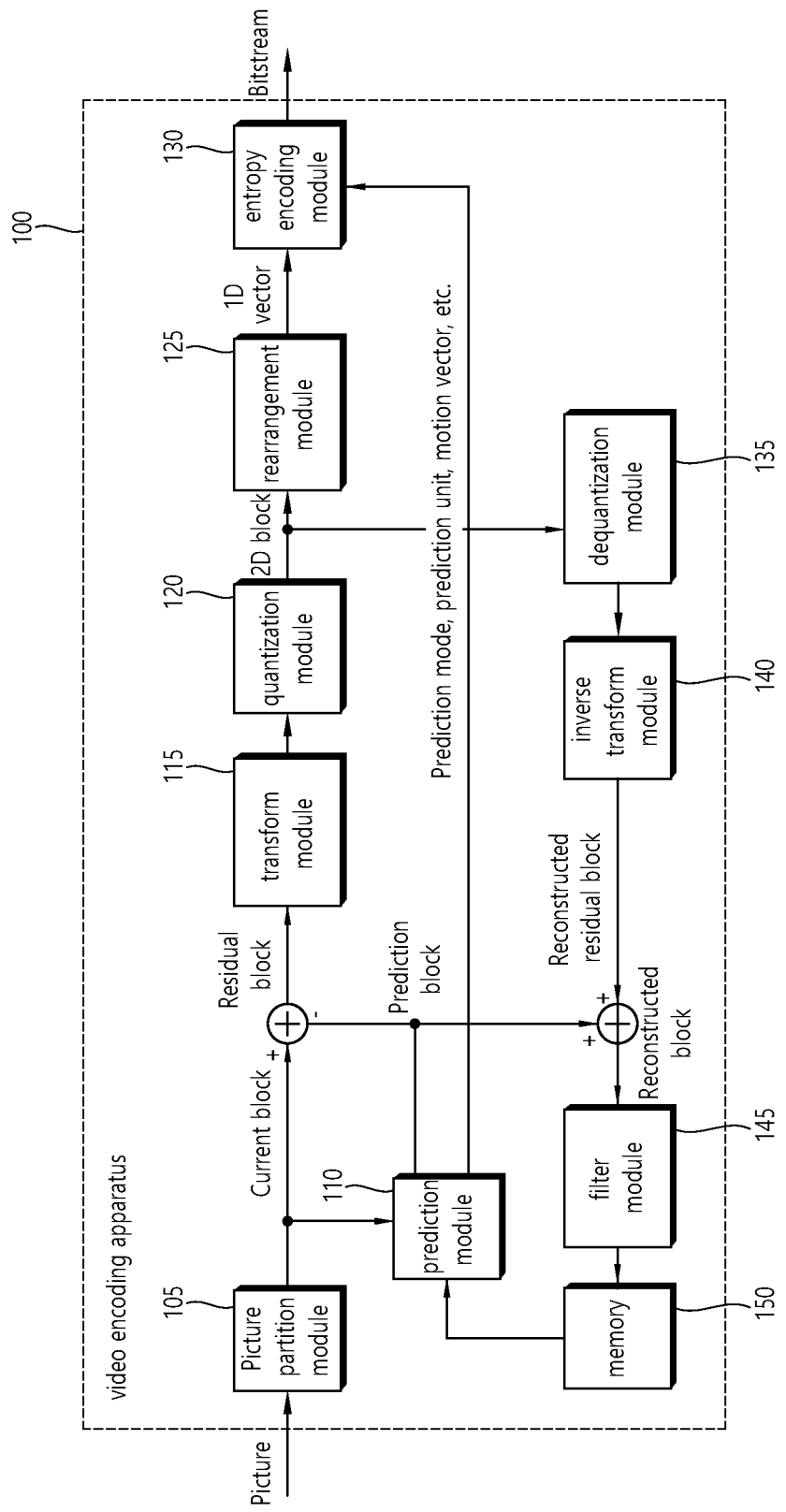
FIG. 1 is a block diagram schematically illustrating a video encoder according to an embodiment of the invention.

DESCRIPTION OF EXEMPLARY
EMBODIMENTS

The present invention can be modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding device and does not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, exemplary embodiments of the invention will be described in detail with reference to the accompanying drawings.

FIG. 1 is a block diagram schematically illustrating a video encoder according to an embodiment of the invention.

Referring to FIG. 1, a video encoder 100 includes a picture partitioning module 105, a prediction module 110, a transform module 115, a quantization module 120, a rearrangement module 125, an entropy encoding module 130, a dequantization module 135, an inverse transform module 140, a filtering module 145, and a memory 150.

The picture partitioning module 105 may be configured to split the input picture into at least one processing unit block. In this connection, a block as a processing unit may be a prediction unit PU, a transform unit TU, or a coding unit CU. The picture may be composed of a plurality of coding tree unit CTUs. Each CTU may be split into CUs as a quad tree structure. The CU may be split into CUs having a deeper depth as a quad-tree structures. The PU and TU may be obtained from the CU. For example, the PU may be partitioned from a CU into a symmetric or asymmetric square structure. Further, the TU may be split into a quad tree structure from the CU.

The prediction module 110 includes an inter prediction module that performs an inter prediction process and an intra prediction module that performs an intra prediction process, as will be described later. The prediction module 110 performs a prediction process on the processing units of a picture divided by the picture dividing module 105 to create a prediction block including a prediction sample or a prediction sample array. In the prediction module 110, the processing unit of a picture may be a CU, a TU, or a PU. The prediction module 110 may determine whether the prediction performed on the corresponding processing unit is an inter prediction or an intra prediction, and may determine specific details for example, a prediction mode of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process may be performed on the basis of information on at least one of a previous picture and/or a subsequent picture of a current picture to create a prediction block. In the intra prediction, a prediction process may be performed on the basis of pixel information of a current picture to create a prediction block.

The inter prediction may use a skip mode, a merge mode, or Advanced Motion Vector Prediction (AMVP). In the inter prediction, a reference picture may be selected for the PU, and a reference block corresponding to the PU may be selected. The reference block may be an integer pixel or sample unit, or a fractional pixel or sample unit. The prediction block is then generated for which the residual signal relative to the current PU is minimized and the motion vector size is minimized.

A prediction block may be generated as an integer pixel unit, or as a fractional pixel unit such as a ½ pixel unit or a ¼ pixel unit. In this connection, a motion vector may also be expressed as a fractional pixel unit.

Information such as the index of the reference picture selected via the inter prediction, the motion vector difference MDV, the motion vector predictor MVP, residual signal, etc., may be entropy encoded and then transmitted to the decoder. When the skip mode is applied, the prediction block may be used as a reconstruction block, so that the residual may not be generated, transformed, quantized, or transmitted.

When the intra prediction is performed, the prediction mode may be determined in the unit of PU and the prediction process may be performed in the unit of PU. Alternatively, the prediction mode may be determined in the unit of PU and the inter prediction may be performed in the unit of TU.

The prediction modes in the intra prediction may include 33 directional prediction modes and at least two non-directional modes, as an example. The non-directional modes may include a DC prediction mode and a planar mode.

In the intra prediction, a prediction block may be constructed after a filter is applied to a reference sample. At this time, it may be determined whether a filter should be applied to a reference sample depending on the intra prediction mode and/or the size of a current block.

Residual values (a residual block or a residual signal) between the constructed prediction block and the original block are input to the transform module 115. The prediction mode information, the motion vector information, and the like used for the prediction are encoded along with the residual values by the entropy encoding module 130 and are transmitted to the decoder.

The transform module 115 performs a transform process on the residual block in the unit of TUs and creates transform coefficients.

A transform block is a rectangular block of samples and is a block to which the same transform is applied. The transform block may be a TU and may have a quad-tree structure.

The transform module 115 may perform a transform process depending on the prediction mode applied to a residual block and the size of the block.

For example, when intra prediction is applied to a residual block and the residual block has an 4×4 array, the residual block is transformed using discrete sine transform DST. Otherwise, the residual block may be transformed using discrete cosine transform DCT.

The transform module 115 may construct a transform block of transform coefficients through the transform.

The quantization module 120 may quantize the residual values, that is, transform coefficients, transformed by the transform module 115 and may create quantization coefficients. The values calculated by the quantization module 120 may be supplied to the dequantization module 135 and the rearrangement module 125.

The rearrangement module 125 may rearrange the transform coefficients supplied from the quantization module 120. By rearranging the quantization coefficients, it is possible to enhance the encoding efficiency in the entropy encoding module 130.

The rearrangement module 125 may rearrange the quantized transform coefficients in the form of a two-dimensional block to the form of a one-dimensional vector through the use of a coefficient scanning method.

The entropy encoding module 130 may be configured to entropy code the symbol according to a probability distribution based on the quantized transform values rearranged by the rearrangement module 125 or the encoding parameter value calculated during the encoding process, etc. and then to output a bit stream. The entropy encoding method is a method of receiving a symbol having various values and expressing the symbol as a binary string that can be decoded while removing statistical redundancy thereof.

In this connection, the symbol means the to-be encoded/decoded syntax element, coding parameter, residual signal value and so on. The encoding parameter is required for encoding and decoding. The encoding parameter may contain information that can be inferred during encoding or decoding, as well as information encoded in an encoder and passed to a decoder like the syntax element. The encoding parameter is the information needed to encode or decode the image. The encoding parameter may include statistics or values such as for example, the intra/inter prediction mode, movement/motion vector, reference picture index, coding block pattern, residual signal presence or absence, transform coefficient, quantized transform coefficient, quantization parameter, block size, block partitioning information, etc. Further, the residual signal may mean a difference between an original signal and a prediction signal. Further, the difference between the original signal and the prediction signal may be transformed to define the residual signal, or the difference between the original signal and the prediction signal may be transformed and quantized to define the residual signal. The residual signal can be called the residual block in the block unit.

When the entropy encoding is applied, the symbols may be expressed so that a small number of bits are allocated to a symbol having a high probability of occurrence, and a large number of bits are allocated to a symbol having a low probability of occurrence. This may reduce the size of the bit string for the to-be-encoded symbols. Therefore, the compression performance of image encoding may be increased via the entropy encoding.

Encoding schemes such as exponential golomb, Context-Adaptive Variable Length Coding (CAVLC), and Context-Adaptive Binary Arithmetic Coding (CABAC) may be used for the entropy encoding. For example, the entropy encoding module 130 may store therein a table for performing entropy encoding, such as a variable length coding/code (VLC) table. The entropy encoding module 130 may perform entropy encoding using the stored VLC table. Further, the entropy encoding module 130 derives a binarization method of a corresponding symbol and a probability model of a corresponding symbol/bin, and then performs entropy encoding using the derived binarization method or probability model.

The entropy encoding module 130 may give a predetermined change to a parameter set or syntaxes to be transmitted, if necessary.

The dequantization module 135 dequantizes the values transform coefficients quantized by the quantization module 120. The inverse transform module 140 inversely transforms the values dequantized by the dequantization module 135.

The residual value or residual sample or residual sample array generated by the dequantization module 135 and the inverse-transform module 140, and the prediction block predicted by the prediction module 110 may be combined to form a reconstructed block including a reconstructed sample or a reconstructed sample array.

In FIG. 1, a residual block and a prediction block are added to create a reconstructed block by an adder. At this time, the adder may be considered as a particular module reconstructed block creating module that creates a reconstructed block.

The filtering module 145 applies a deblocking filter, an ALF Adaptive Loop Filter, an SAO Sample Adaptive Offset to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

On the other hand, the filtering module 145 may not perform a filtering operation on the reconstructed block used in the inter prediction.

The memory 150 may store the reconstructed block or picture calculated by the filtering module 145. The reconstructed block or picture stored in the memory 150 may be supplied to the prediction module 110 that performs the inter prediction.

Figure 2:
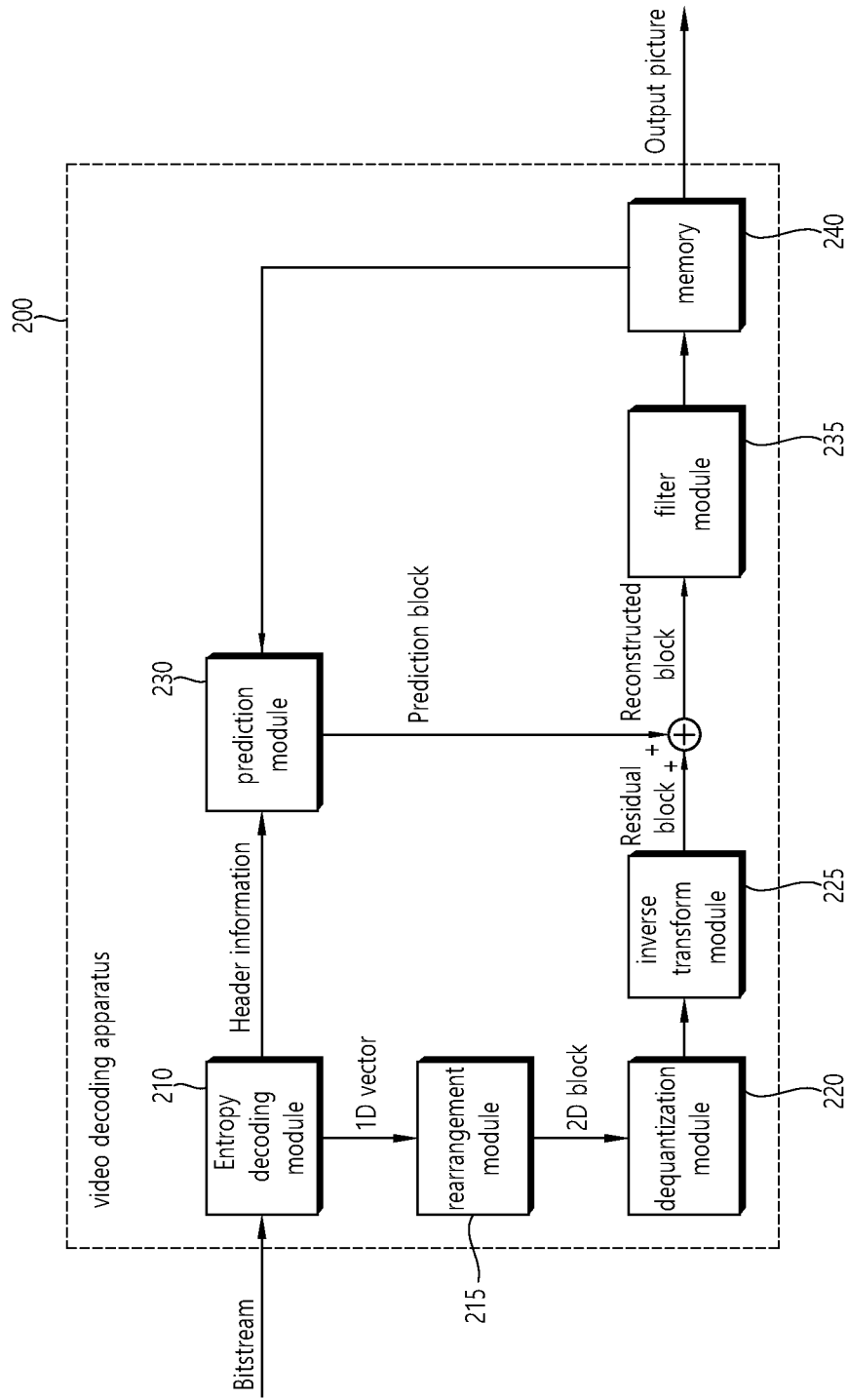
FIG. 2 is a block diagram schematically illustrating a video decoder according to an embodiment of the invention.

FIG. 2 is a block diagram schematically illustrating a video decoder according to an embodiment of the invention. Referring to FIG. 2, a video decoder 200 may include an entropy decoding module 210, a rearrangement module 215, a dequantization module 220, an inverse transform module 225, a prediction module 230, a filtering module 235, and a memory 240.

When a video bitstream is input from the video encoder, the input bitstream may be decoded on the basis of the order in which video information is processed by the video encoder.

The entropy decoding module 210 may entropy-decode the input bitstream according to a probability distribution to generate symbols in a quantized coefficient form. The entropy decoding method is a method of receiving a sequence of binary numbers and generating each of the symbols using the sequence. The entropy decoding method is similar to the entropy encoding method described above.

For example, when a Variable Length Coding VLC (hereinafter referred to as 'VLC') such as CAVLC is used to perform entropy encoding in a video encoder, the entropy decoding module 210 may perform decoding using the same VLC table as the encoder used in the encoder. Further, when CABAC is used to perform entropy encoding in a video encoder, the entropy decoding module 210 may perform the entropy decoding using CABAC.

More specifically, the CABAC entropy decoding method may include receiving a bin corresponding to each syntax element in a bitstream, determining a context model using to-be-decoded syntax element information, decoding information of a neighboring block and a to-be-decoded block, or information of a symbol/bin decoded in a previous step, and predicting a probability of occurrence of a bin according to the determined context model and thus performing arithmetic decoding of the bin to generate a symbol corresponding to a value of each syntax element. In this connection, after determining the context model, the CABAC entropy decoding method may further include a step of updating the context model using the information of the decoded symbol/bin to determine a context model of the next symbol/bin.

Information for constructing a predicted block out of the information decoded by the entropy decoding module 210 may be supplied to the prediction module 230, and the residual values, that is, the quantized transform coefficients, entropy-decoded by the entropy decoding module 210 may be input to the rearrangement module 215.

The rearrangement module 215 may rearrange the bitstream information, that is, the quantized transform coefficients, entropy-decoded by the entropy decoding module 210 on the basis of the rearrangement method in the video encoder.

The rearrangement module 215 may reconstruct and rearrange the coefficients expressed in the form of a one-dimensional vector into coefficients in the form of a two-dimensional block. The rearrangement module 215 may scan the coefficients on the basis of the prediction mode applied to the current block transform block and the size of the transform block and may create an array of coefficients quantized transform coefficients in the form of a two-dimensional block.

The dequantization module 220 may perform dequantization on the basis of the quantization parameters supplied from the video encoder and the coefficient values of the rearranged block.

The inverse transform module 225 may perform the inverse DCT and/or inverse DST of the DCT and/or DST, which has been performed by the transform module of the video encoder, on the quantization result from the video encoder.

The inverse transform may be performed on the basis of a transfer unit or a partition unit of a picture determined by the video encoder. The transform module of the video encoder may selectively perform the DCT and/or DST depending on plural information pieces such as the prediction method, the size of a current block, and the prediction direction, and the inverse transform module 225 of the video decoder may perform the inverse transform on the basis of the transform information on the transform performed by the transform module of the video encoder.

The prediction module 230 generates a prediction block including a prediction sample or a prediction sample array based on the prediction block generation-related information provided by the entropy decoding module 210 and the previously decoded block and/or picture information provided from the memory 240.

If the prediction mode for the current PU is the intra prediction mode, the prediction module 230 may perform the intra prediction to generate a prediction block based on pixel information in the current picture.

If the prediction mode for the current PU is the inter prediction mode, the prediction module 230 may be configured to perform inter prediction on a current PU based on information included in at least one picture of a previous picture or a subsequent picture to the current picture. In this connection, information about the motion information necessary for inter prediction of the current PU provided in the video encoder, such as motion vector and reference picture index may be deduced via checking the skip flag and merge flag received from the encoder.

The prediction module 230 may generate a prediction block such that the residual signal relative to the current block is minimized and the motion vector size is minimized when inter prediction is performed on the current picture.

On the other hand, the motion information derivation method may be changed according to the prediction mode of the current block. The prediction mode applied to inter prediction may include an Advanced Motion Vector Prediction (AMVP) mode, a merge mode, and the like.

For example, when a merge mode is applied, the encoding apparatus and the decoding apparatus may generate a merge candidate list using the motion vector of the restored spatial neighboring block and/or the motion vector corresponding to the Col block which is a temporally neighboring block. In the merge mode, the motion vector of the candidate block selected in the merge candidate list is used as the motion vector of the current block. The encoding apparatus may transmit a merge index indicating a candidate block having an optimal motion vector selected from the candidate blocks included in the merge candidate list to the decoder. In this case, the decoder may derive the motion vector of the current block using the merge index.

In another example, when the AMVP (Advanced Motion Vector Prediction) mode is applied, the encoder and decoder generate a motion vector predictor candidate list using a motion vector of a reconstructed spatial neighboring block and/or a motion vector corresponding to a Col block as a temporal neighboring block. That is, the motion vector of the reconstructed spatial neighboring block and/or the motion vector corresponding to the Col block as a temporal neighboring block may be used as a motion vector candidate. The encoder may transmit to the decoder a prediction motion vector index indicating the optimal motion vector selected from among the motion vector candidates included in the motion vector predictor candidate list. In this connection, the decoder may select the prediction motion vector for the current block from the motion vector candidates included in the motion vector candidate list using the motion vector index.

The encoder may obtain the motion vector difference MVD between the motion vector for the current block and the motion vector predictor (MVP), encode the MVD, and transmit the encoded MVD to the decoder. That is, the MVD may be a value obtained by subtracting the motion vector predictor (MVP) from the motion vector (MV) for the current block. In this connection, the decoder may decode the received motion vector difference, and derive the motion vector for the current block via addition between the decoded motion vector difference and the motion vector predictor.

Further, the encoder may transmit a reference picture index indicating a reference picture to the decoder.

The decoder may predict the motion vector of the current block using the motion information of the neighboring block and derive the motion vector of the current block using the residual received from the encoder. The decoder may generate the prediction block for the current block based on the derived motion vector and the reference picture index information received from the encoder.

In another example, when the merge mode is applied, the encoder and decoder may generate a merge candidate list using the motion information of the reconstructed neighboring block and/or the motion information of the Col block. That is, when the reconstructed neighboring block and/or the motion information of the Col block exists, the encoder and decoder may use the reconstructed neighboring block and/or the motion information of the Col block as a merge candidate for the current block.

The encoder may select a merge candidate that provides optimal encoding efficiency among the merge candidates included in the merge candidate list as the motion information for the current block. In this connection, a merge index indicating the selected merge candidate may be included in the bitstream which is transmitted to the decoder. The decoder may select one of the merge candidates included in the merge candidate list using the transmitted merge index, and the decoder may determine the selected merge candidate as motion information of the current block. Therefore, when the merge mode is applied, the motion information of the reconstructed neighboring block and/or the Col block may be used as the motion information for the current block as it is. The decoder may reconstruct the current block by adding the prediction block and the residual transmitted from the encoder to each other.

In the above-described AMVP and merge modes, motion information of the reconstructed neighboring block and/or motion information of the Col block may be used to derive motion information of the current block.

In the skip mode, which is one of the other modes used for inter-picture prediction, neighboring block information may be used for the current block as it is. Therefore, in the case of skip mode, the encoder does not transmit syntax information such as the residual to the decoder in addition to information indicating which block's motion information to use as the motion information for the current block.

The encoder and the decoder may generate a prediction block of the current block by performing motion compensation on the current block based on the derived motion information. In this connection, a prediction block may refer to a motion-compensated block as generated by performing motion compensation on the current block. Further, a plurality of motion compensated blocks may constitute a single motion compensated image.

The reconstructed block may be generated using the prediction block generated by the prediction module 230 and the residual block provided by the inverse-transform module 225. FIG. 2 illustrates that using the adder, the prediction block and the residual block are combined to generate the reconstructed block. In this connection, the adder may be viewed as a separate module (a reconstructed block generation module) that is configured to generate the reconstructed block. In this connection, the reconstructed block includes a reconstructed sample or a reconstructed sample array as described above; the prediction block includes a prediction sample or a prediction sample array; the residual block may include a residual sample or a residual sample array. Therefore, the reconstructed sample or the reconstructed sample array can be considered to be generated by combining the corresponding prediction sample or prediction sample array with the corresponding residual sample or residual sample array.

When the skip mode is used for a block, the residual signal may not be transmitted and the predicted block may be used as a reconstructed block.

The reconstructed block and/or picture may be supplied to the filtering module 235. The filtering module 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output module.

The elements that is directly related to decoding images among the entropy decoding module 210, the rearrangement module 215, the dequantization module 220, the inverse transform module 225, the prediction module 230, the filtering module 235 and the memory 240 which are included in the decoding apparatus 200, for example, the entropy decoding module 210, the rearrangement module 215, the dequantization module 220, the inverse transform module 225, the prediction module 230, the filtering module 235, and so on may be expressed as a decoder or a decoding unit that is distinguished from other elements.

In addition, the decoding apparatus 200 may further include a parsing unit not shown in the drawing that parses information related to the encoded images included in a bitstream. The parsing unit may include the entropy decoding module 210, and may be included in the entropy decoding module 210. Such a parsing unit may also be implemented as an element of the decoding unit.

An in-loop filter may be applied to the restored picture to compensate for a difference between an original picture and the restored picture due to an error occurring in a compression coding process such as quantization, or the like. As described above, in-loop filtering may be performed in filter units of the encoder and decoder, and the filter units may apply a deblocking filter, a sample adaptive offset (SAO) and/or adaptive loop filter to the restored picture. Here, the ALF may perform filtering based on a value obtained by comparing the restored picture with the original picture after the deblocking filtering and/or the SAO process is performed. The ALF may adaptively a Wiener filter to the restored picture after the deblocking filtering and/or the SAO process is performed. That is, the ALF may compensate for an encoding error using the Wiener filter.

The filter (e.g., ALF) applied to the sample of the restored picture may be determined based on, for example, a filter shape and a filter coefficient. That is, the encoder and the decoder may perform filtering based on the filter shape and the filter coefficient. The filter shape indicates a shape/size of the used filter. That is, one filter shape may be selected for each target area from a plurality of predetermined filter shapes. For example, in the case of the ALF, the filter shape may be various filter shapes and sizes such as an n×n star shape, an m×n cross shape, and an m×n diamond shape. Here, n and m represent positive integers, and n and m may be the same or different.

Here, the filter shape may be represented by various expressions such as a filter size, a filter type, and a filter mode. In addition, when a predetermined filter coefficient is used according to the shape of the filter, the filter coefficient may also be determined based on the filter shape (filter size, filter type, filter mode, or the like).

The encoder may determine the filter shape and/or filter coefficients through a predetermined process. Filtering may be applied to minimize errors occurring in the compression encoding process and the encoder may determine the filter shape and/or filter coefficients to minimize the error. Information on the determined filter may be transmitted to the decoder and the decoder may determine the filter shape and/or filter coefficients based on the transmitted information.

Meanwhile, a filter set (or a filter list) may be configured based on the image properties and an optimal filter may be adaptively applied to the target region based on the filter set. In this case, the encoder may transmit index information on the filter set to the decoder and the decoder may obtain the filter information on the filter applied to the target region based on the index information. That is, the filter information included in the filter set may include the filter shape and/or the filter coefficient. Alternatively, when the encoder and the decoder obtain the image characteristic of the target block through the same method and specific filter information in a predefined filter set is selected and used according to the image properties, the index information may not be transmitted.

That is, according to the present invention, different filters may be applied according to the image properties, thereby enhancing coding efficiency.

The image property may be specified based on at least one of an activity factor and a directivity factor for a target region (or target block).

The activity indicates the property of a texture or an error in the target region of a picture. For example, in a smooth background part, the activity value is small. On the contrary, in a complex part, the activity value is large. The activity value may be set to a value within a specific range through normalization or may be used as an original value itself. For example, when a maximum value of the activity value is 100, the activity value may be normalized to 0 to 9, such as expressing values 0 to 10 as 0, expressing 11 to 20 as 1, or the like or the values of 0 to 100 which are the original values may be used as they are. Meanwhile, when normalization is performed, the range to be mapped for the normalization may be set to be equal/unequal according to importance. For example, when finer filtering is intended to be applied in the case of high activity, values representing relatively low activity are normalized to a single value for a relatively wide range (e.g., 20 units) and values representing relatively high activity may be normalized to the single value for a relatively narrow range (e.g., 5 units). In the present invention, an activity value may include the original value and a normalized value.

The directivity indicates the directivity property of the texture or error in the target region of the picture. For example, the directivity may be horizontal, vertical, diagonal (right upward right/left upward, etc.).

As an example, the activity and the directivity may be derived based on sample points.

Figure 3:
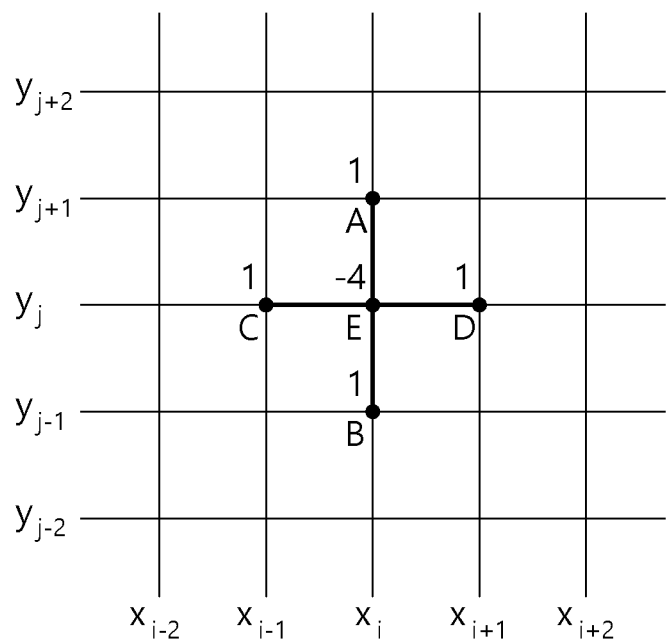
FIG. 3 exemplarily illustrates a method for deriving image properties (activity and directivity) according to an embodiment of the present invention.

FIG. 3 exemplarily illustrates a method for driving image properties (activity and directionality) according to an embodiment of the present invention. FIG. 3 illustrates a method for calculating the image property using five (sample) points.

Referring to FIG. 3, E represents a current sample (or pixel) and A, B, C, and D represent peripheral (four-direction) samples. Here, A represents an upper peripheral sample, B represents a lower peripheral sample, C represents a left peripheral sample, and D represents a right peripheral sample. Based on differences between sample values of E and A and B, a vertical change degree of E may be known and a horizontal change degree of E may be known by using differences between sample values of E and C and D. The vertical change degree and the horizontal change degree may be acquired as follows.

$$\text{Vertical} = |E<<1-A-B|$$

$$\text{Horizontal} = |E<<1-C-D| \qquad \text{[Equation 1]}$$

In Equation 1, Vertical represents the vertical change degree and Horizontal represents the horizontal change degree. E, A, B, C, and D represent sample values for respective sample points and << represents an arithmetic left shift. That is, the vertical change degree for the current sample may be regarded as an absolute value of a value obtained by subtracting A and B from E<<1 and the vertical change degree may be regarded as the absolute value of a value obtained by subtracting C and D from E<<1.

The horizontal change degree and the vertical change degree may represent complexity of the image and the activity of the image may be derived based thereon. Further, the directivity of the corresponding region may be obtained by comparing the vertical change degree and the horizontal change degree. Meanwhile, in this case, a weight may be given for each sample. For example, a number next to each sample point in FIG. 3 exemplarily represents the weight for the corresponding sample point.

In addition, for example, if the activity of the image is defined as five types of 1 to 5 and the directivity of the image is divided into three types of horizontal, vertical, and non-direction, a maximum of 15 types of filters (5 (activities)×3 (directivities)=15) may be indicated based on a total of 15 types of image properties.

Meanwhile, the properties of such an image may be obtained by the unit of the sample (or pixel) and obtained by the unit of a specific target region. For example, the properties (activity and directivity) are obtained for each sample (or pixel) in the target region and then, a representative property for the target region may be determined based on a sum of respective values, a weighted sum, an average, or a median value. In this case, the representative property for the target region may be determined further based on the property values for peripheral samples of the target region.

Figure 4:
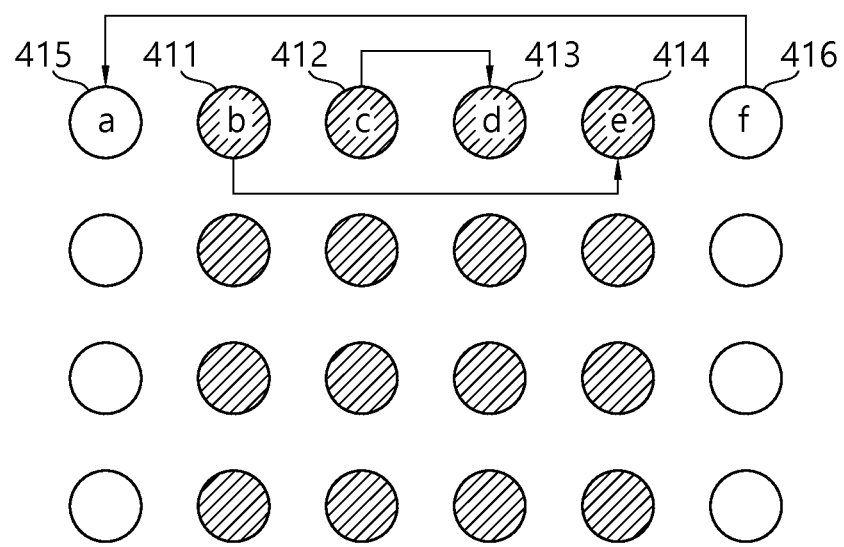
FIG. 4 exemplarily shows a method for obtaining a representative property of a target region based on a weighted sum of property values of samples when the target region has a size of 4×4.

FIG. 4 exemplarily shows a method for obtaining a representative property of a target region based on a weighted sum of property values of samples when the target region has a size of 4×4.

Referring to FIG. 4, hatched samples 411, 412, 413, 414, etc. represent samples in the target region and unhatched samples 415, 416, etc. represent the peripheral samples of the target region. Here, each sample may include property values including a horizontal property, a vertical property, and the like. When the property values of the samples 411, 412, 413, 414, 415, and 416 are represented by b, c, d, e, a, and f, respectively, a representative property value of the target region may be obtained based on an equation below.

$$(c+d)*3+(b+e)*2+(a+f) \qquad \text{[Equation 2]}$$

That is, the representative property of the target region may be obtained based on the weighted sum of the samples of a column and/or a row.

Meanwhile, in order to obtain the directivity, it is possible to know which of the two properties is larger by comparing the horizontal property value and the vertical property value. However, since a method through the comparison is relative, the intensity of an absolute directivity property of the image may not be known. In other words, the activity property of the image are represented by the sum of the horizontal and vertical properties and the directivity property may be represented through a comparison between the horizontal property and the vertical property, but in this case, there is a lack of showing a strength in consideration of the directivity property.

Figure 5:
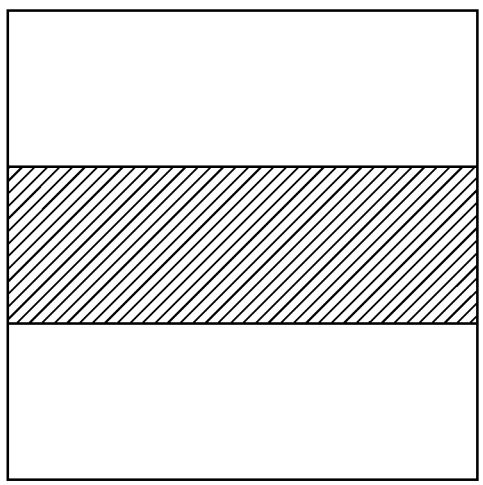
FIG. 5 illustrates an example in which an image has the same activity property but different directivity properties.
Figure 5:
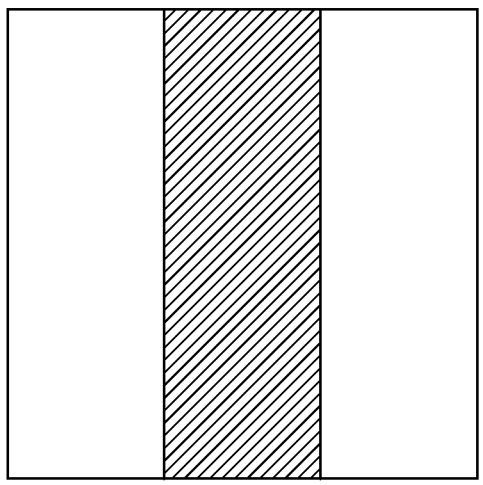

FIG. 5 illustrates another example in which an image has the same activity property but different directivity properties.

Referring to FIG. 5, overall activities (or complexities) of FIGS. 5(a) and 5(b) are the same, but the activities taking into account the two directivities are different. Therefore, in order to reflect the more accurate image properties, this case may be shown by combining the activity property and the directivity property of the image as an embodiment of the present invention. In other words, both the overall activity and the directivity activity may be used by representing the activity (or complexity) of the image as a combination of the horizontal activity and the vertical activity.

FIG. 6 illustrates an example of image properties classification through combination of horizontal activity and vertical activity according to an embodiment of the present invention. Representative activity for the target region may be expressed as the sum of the horizontal activity and the vertical activity, the, weighted sum, the average, or the median value.

Meanwhile, although the image property of the current sample is calculated using five sample points in FIG. 3, the image property for the current sample may be calculated using, for example, nine sample points.

Figure 7:
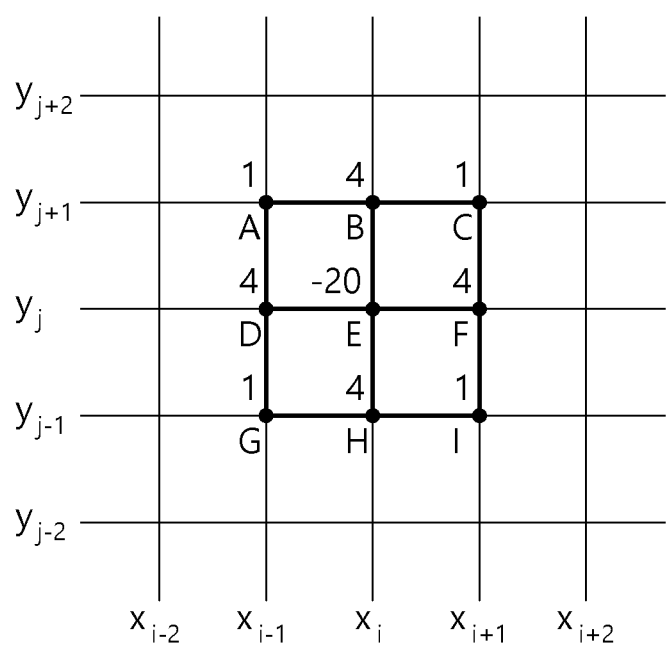
FIG. 7 exemplarily illustrates a method for deriving image properties (activity and directivity) according to another embodiment of the present invention.

FIG. 7 exemplarily illustrates a method for deriving image properties (activity and directivity) according to another embodiment of the present invention. FIG. 7 illustrates a method for calculating the image property using nine (sample) points. In this case, a diagonal property may be better reflected.

Referring to FIG. 7, E represents the current sample (or pixel) and A, B, C, D, F, H, and I represent peripheral (eight-direction) samples. Here, A represents an upper left peripheral sample, B represents an upper peripheral sample, C represents an upper right peripheral sample, D represents a left peripheral sample, F is a right peripheral sample, G represents a lower left peripheral sample, H represents a lower peripheral sample, and I represents a lower right peripheral sample. Based on the differences between sample values of E and A and B, the vertical change degree of E may be known and the horizontal change degree of E may be known by using the differences between sample values of E and C and D. The vertical change degree and the horizontal change degree may be acquired as follows as one example.

Based on E, C, and the change degree in a 45-degree (upper right diagonal)-direction may be obtained and based on E, A, and I, the change degree in a −45-degree (upper left diagonal or lower right diagonal) direction may be obtained. Meanwhile, as described above, the vertical change degree may be obtained based on E, B, and H and the horizontal change degree may be obtained based on E, D, and F. In this case, it is possible to show more directivities than when using the 5 points. Meanwhile, in this case, as described above, the weight may be given for each sample and for example, a larger weight may be given to the horizontal/vertical samples than the diagonal samples as illustrated in FIG. 4.

Further, in this case, for example, the directivity may be divided into five types of horizontal, vertical, 45 degrees, −45 degrees, and non-direction. When the activity is defined as five types of 1 to 5, a maximum of 25 types of filters (5 (activities)×5 (directivities)=25) may be indicated based on a total of 25 types of image properties.

In this case, the properties (activity and directivity) are obtained for each sample (or pixel) in the target region and then, the representative property for the target region may be determined based on the sum of the respective values, the weighted sum, the average, or the median value. In this case, the representative property for the target region may be determined further based on the property values for the peripheral samples of the target region.

Figure 8:
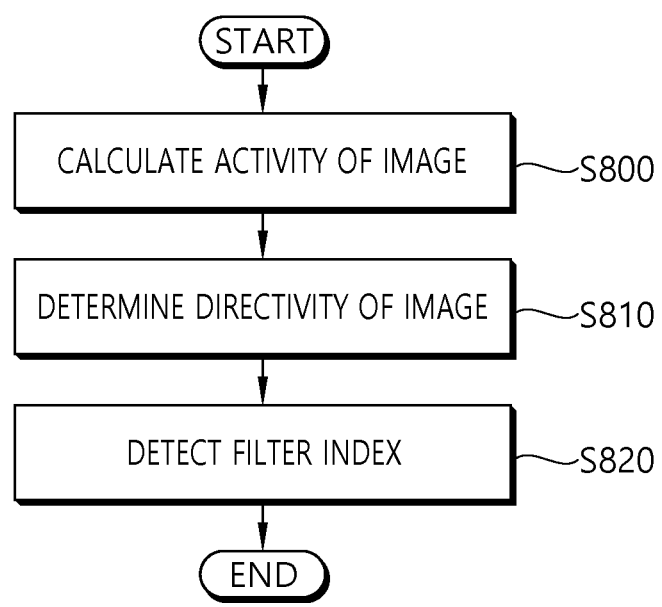
FIG. 8 schematically illustrates a method of selecting a filter based on image properties according to an embodiment of the present invention.

FIG. 8 schematically illustrates a method of selecting a filter based on image properties according to an embodiment of the present invention. The method disclosed in FIG. 8 may be performed by a coding apparatus, that is, the encoder or the decoder. Hereinafter, the method is described based on the coding apparatus and the coding apparatus may include the encoder and the decoder.

The coding apparatus calculates the activity of the directivity of the image in the restored picture (S800). Here, the activity of the image may be calculated by the unit of the target region. The method for calculating the activity by the unit of the target region includes the method.

The coding apparatus determines the directivity of the image in the restored picture (S810). Here, the directivity of the image may be calculated by the unit of the target region. The method for calculating the directivity by the unit of the target region includes the method. The directivity of the image and the activity of the image are combined to be referred to as the image property.

The coding apparatus detects an index of a specific filter (filter shape) to be used based on the image property (i.e., the activity of the image and the directivity of the image) for the target region (S820). The coding apparatus may detect the index of the specific filter in a filter set (or a filter list) based on the image property.

The coding apparatus may apply the specific filter indicated by the index to the target region of the restored picture. Therefore, the coding apparatus may improve a subjective/objective image quality of the restored picture by applying a filter suitable for the image property to the restored picture.

Figure 9:
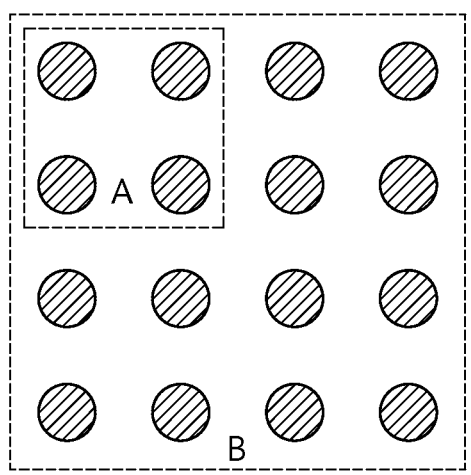
FIG. 9 illustrates an example of a target region to which the present invention is applied. Here, the object region may be called a property classification unit.

FIG. 9 illustrates an example of a target region to which the present invention is applied. Here, the target region may be called a property classification unit.

Referring to FIG. 9, region A is a region having a size of 2×2 and region B is a region having a size of 4×4. The target region according to the present invention may include the regions A and B. That is, the target region may have the size of 2×2 or the size of 4×4. However, this is an example and the target region may have a size of 8×8, 16×16, 32×32, or 64×64.

In this case, as described above in FIGS. 3 and 7, the activity and the directivity for the target region are obtained for each sample (or pixel) in the target region and then, the representative property for the target region may be determined based on the sum of the respective values, the weighted sum, the average, or the median value. Alternatively, the properties (activity and directivity) of the peripheral samples of the target region are obtained and then, based on property values for the samples and the peripheral samples of the target region, the representative property for the target region may be determined.

Meanwhile, as an example, the size of the target region may be signaled from the encoder to the decoder and whether a diagonal direction is also considered in the image property detection may also be signaled.

Figure 10:
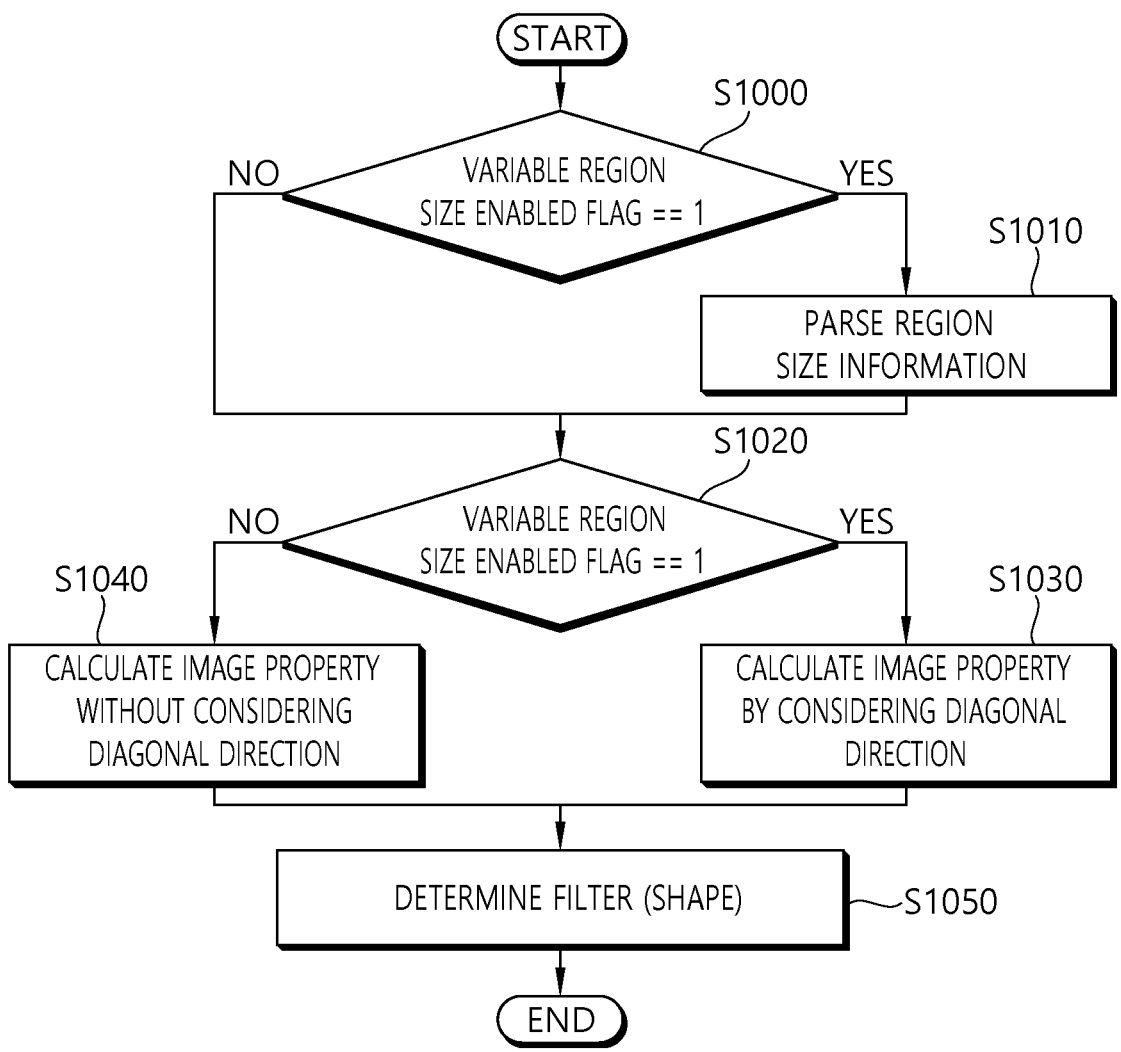
FIG. 10 schematically illustrates a method of selecting a filter based on image properties according to an embodiment of the present invention.

FIG. 10 schematically illustrates a method of selecting a filter based on image properties according to an embodiment of the present invention. The method disclosed in FIG. 10 may be performed by the decoder.

Referring to FIG. 10, the decoder receives a variable region size enabled flag and confirms that the value of the corresponding flag indicates 1 (S1000). Here, the variable region size enabled flag may be represented by, for example, a Variable_Var_Size_enabled_flag syntax element. The variable region size enabled flag may be signaled at a sequence level, a picture level, a slice level, or the like.

When the value of the variable region size enabled flag is 0, the size of the target region is fixed and when the value of the variable region size enabled flag is 1, the size of the target region may be varied and in this case, coding a detailed size is required.

When the value of the variable region size flag is 1 in S1000, the decoder receives and parses region size information (S1010). The decoder may know the size of the target region based on the region size information. The region size information may be represented by, for example, a Var_Size syntax element.

The size of the target region may be regarded as the image property classification unit, which may be defined as a pixel unit to a block unit of a specific size.

TABLE 1

| Var size | cMax = 4, TU binarization |
|---|---|
| 0 | 0 |
| 1 | 10 |
| 2 | 110 |
| 3 | 1110 |
| 4 | 1111 |

Referring to Table 1, Var size represents an index indicating a classification unit. That is, Var size indicates the value of the target region size information. For example, the target region may represent the pixel unit (i.e., 1×1 unit) when the Var size value is 0, a 2×2 unit when the Var size value is 1, a 4×4 unit when the Var size value is 2, an 8×8 unit when the Var size is 3, an 8×8 unit when the Var size is 4, and a 16×16 unit when the Var size is 4. Binarization values (i.e., Bin values) corresponding to the respective Var size values 0 to 4 may be, for example, 0, 10, 110, 1110, and 1111, respectively. Here, the binarization values are truncated unary (TU) binarized values and exemplarily represent a case where cMax=4.

Meanwhile, the following binarization values may be used in consideration of the number of bits allocated to binarization as shown in the following table.

TABLE 2

| Var size | cMax = 4, TU binarization |
|---|---|
| 0 | 0 |
| 1 | 100 |
| 2 | 101 |
| 3 | 110 |
| 4 | 111 |

Further, besides, various other binarization methods including fixed length code (FLC) exponential-Golomb binarization, and the like may also be used.

When the value of the variable region size flag is 0 in S1000, the decoder determines that the size of the target region is fixed to a predetermined value.

The decoder receives a diagonal activity enabled flag and confirms that the value of the diagonal activity availability flag indicates 1 (S1020). Here, the diagonal activity enabled flag may be represented by, for example, a Diagonal_Activity_enabled_flag syntax element. The diagonal activity enabled flag may be signaled at the sequence level, the picture level, the slice level, or the like.

When the value of the diagonal activity enabled flag is 0, the decoder may consider the horizontal and vertical change degrees with respect to the target region and when the value of the diagonal activity enabled flag is 1, the decoder may further consider the diagonal change degree with respect to the target region.

When the value of the diagonal activity enabled flag is 1 in S1020, the decoder calculates the image property by considering a diagonal direction (S1030). In this case, the decoder may consider not only the diagonal direction but also horizontal and vertical directions.

When the value of the diagonal activity enabled flag is 0 in S1020, the decoder calculates the image property without considering the diagonal direction (S1040). In this case, the decoder may calculate (or detect) the image property by considering only the horizontal and vertical directions.

Meanwhile, although FIG. 10 illustrates that the image property calculation is performed after step S1020, the calculation of the image activity among the image properties may be performed before step S1020 and only the calculation of the image directivity may be performed after step S1020. In this case, the calculation of the image activity may be performed without considering the diagonal direction regardless of step S1020 or may be performed by considering the diagonal direction.

The decoder determines a filter (filter shape) corresponding to the image property based on the image property of the target region detected in S1030 or S1040 (S1050). The decoder may detect the specific filter to be used among the filter set (or the filter list) based on the image property and in this case, the decoder may detect the index for the specific filter in the filter set.

According to the present invention, various filter shapes may be used for each target region and the encoder/decoder may select various filters (filter shapes) for each target region based on the image property. For example, in the case of the ALF, the filter may adopt various filter shapes and sizes including an n×n first shape (e.g., a star shape), an m×n second shape (e.g., a cross shape), an m×n third shape (e.g., a diamond shape), and the like. Here, n and m represent positive integers, and n and m may be the same or different.

Figure 11:
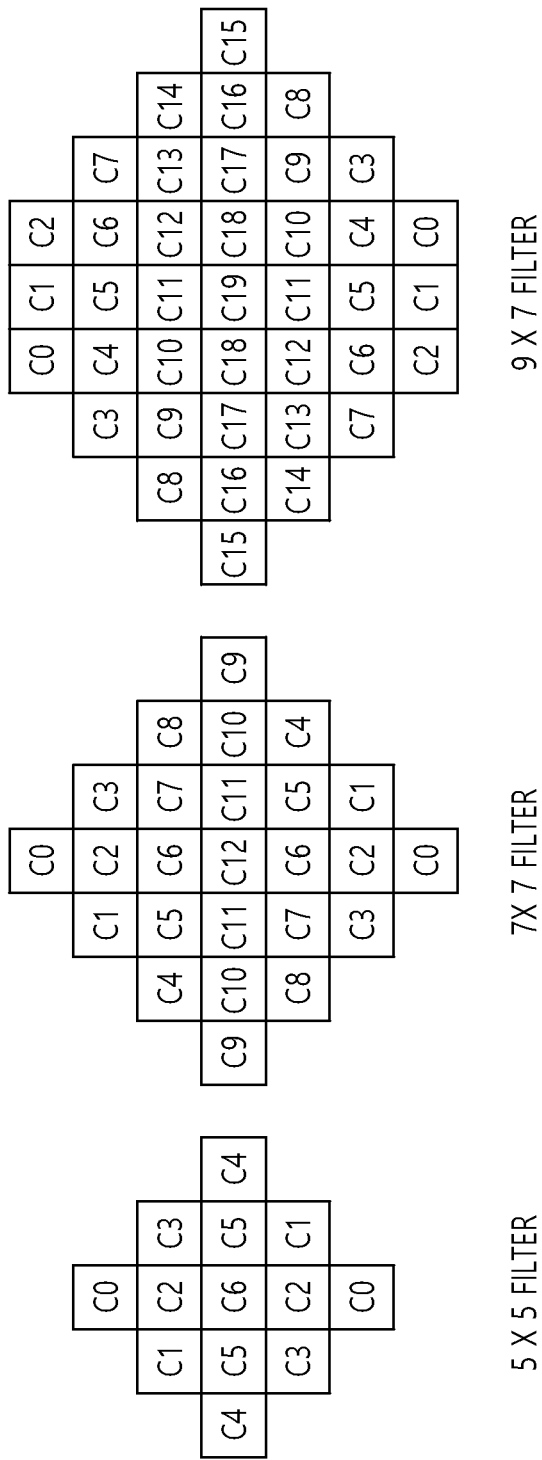
FIG. 11 is a diagram illustrating an embodiment of filter shapes according to the present invention.

FIG. 11 is a diagram illustrating an embodiment of filter shapes according to the present invention.

As described above, in performing the filtering according to the present invention, the encoder and the decoder may select and use one filter among a plurality of predetermined filters. That is, the encoder and the decoder may select one filter from a predetermined set of filters including the plurality of filters and perform the filtering based on the selected filter. For example, ALF filtering may be applied for the filtering according to the present invention.

The filter included in the filter set may have the filter shape illustrated in FIG. 11.

Meanwhile, according to the present invention, the filter coefficient may be assigned according to the filter shape. Hereinafter, in the present specification, a location and/or unit to which each filter coefficient is assigned is referred to as a filter tap. In this case, one filter coefficient may be assigned to each filter tap and a pattern in which the filter taps are arranged may correspond to the filter shape.

Further, hereinafter, the filter tap located at the center of the filter shape will be referred to as a center filter tap in the present specification. The filter taps are symmetrical around the center filter tap located at the center of the filter shape. For example, the filter taps may be numbered in a raster scan order and may be numbered from the beginning to the center tap in an ascending order and from the center tap to the end in a descending order. The filter coefficients other than the filter coefficients assigned to the center filter taps may be equally assigned to the two filter taps corresponding to each other based on the center filter tap. In FIG. 11, C6 represents the center tap in the case of a 5×5 filter, C12 represents the center tap in the case of a 7×7 filter, and C19 represents the center tap in the case of a 9×7 filter.

Meanwhile, the filter shape and size is an example and more various shapes and sizes filters may be used. Various shapes and sizes of filters are used because the shape and the size of the filter which are suitable vary depending on the image property. In an encoding/decoding process, a filter having best RD cost (Rate-Distortion Cost) may be selected and used. Since the size of the used image is varied and particularly, a high resolution image is used, the size and the shape of the filter also need to be varied for optimal filtering.

Figure 12:
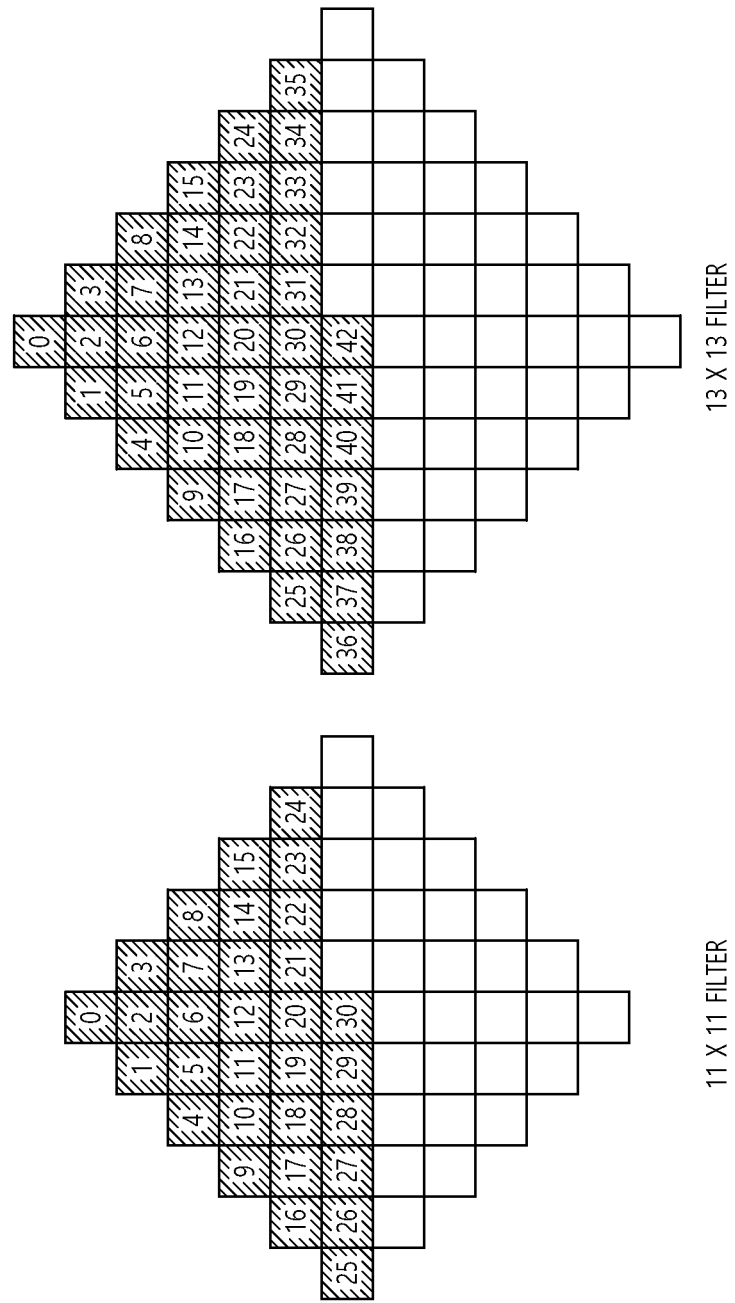
FIGS. 12 and 13 are diagrams illustrating other embodiments of the filter shapes according to the present invention.
Figure 13:
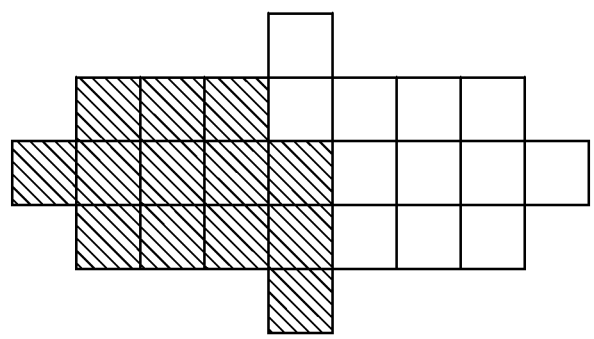
Figure 13:
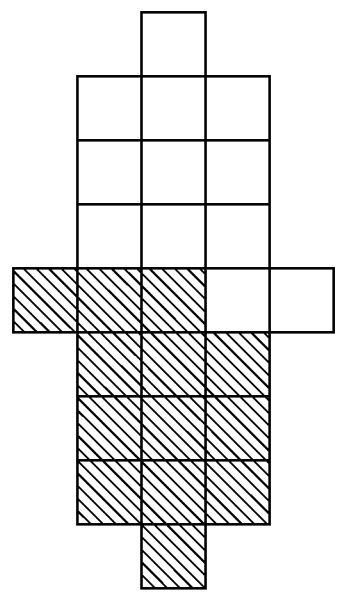

FIGS. 12 and 13 are diagrams illustrating other embodiments of the filter shapes according to the present invention.

In FIGS. 12 and 13, letters displayed on each filter tap represent the filter coefficients assigned to each filter tap. The filter coefficients may be assigned in a center symmetric form around the center filter tap, similarly as in the embodiment of FIG. 11. That is, the same filter coefficient may be assigned to two filter taps existing at THE symmetrical positions around the center filter tap.

Therefore, in each of the filter shapes of FIGS. 12 and 13, the filter coefficients are displayed only on the left and/or upper filter taps among the two filter taps located at symmetrical positions around the center filter tap. In FIGS. 12 and 13, the filter coefficients assigned to the filter taps at THE symmetrical positions around the center filter tap may be assigned to the filter taps in which the filter coefficients are not displayed.

In FIG. 12, an 11×11 filter and a 13×13 filter are illustrated. However, the filters are examples and a horizontal size and a vertical size of the filter may be different from each other. For example, 11×9 and 13×11 filters are also possible.

Further, FIG. 13 illustrates examples of a horizontal filter and a vertical filter. The vertical size and the vertical size of each of the horizontal and vertical filters may be different from each other. Here, a 9×5 size filter and a 5×9 size filter are illustrated. In this case, the number of filter coefficients used is the same as that of the 7×7 filter. That is, in this case, 13 filter coefficients may be provided and 25 filter taps may be filled. Meanwhile, the filter may be applied according to the horizontal and vertical properties according to the image property without changing the number of required filter coefficients. In this case, in addition to the 9×5 size and the 5×9 size, filters having a size of 11×7, a size of 7×11, a size of 13×9, and a size of 9×13 may be used.

Meanwhile, when the number of available filters is large, it is possible to apply a filter suitable for an image, but a problem of computational complexity may increase. For example, when the encoder selects an appropriate filter and signals information indicating the corresponding filter to the decoder, the encoder has a disadvantage of applying all of the existing filters in order to determine which filter is better to use and further, the quantity of bits for signaling the information indicating the selected filter among the multiple filters also increases. Therefore, when the number of available filters in the set of filters is excessively increased in order to increase the filtering efficiency, the computational complexity rather increases and the bit quantity of the information indicating the selected filter increases, and as a result, performance may not be enhanced.

In order to prevent that the performance may not be enhanced, the number and shape (or sizes) of the filters included in the filter set may be determined based on the resolution of the image.

Figure 14:
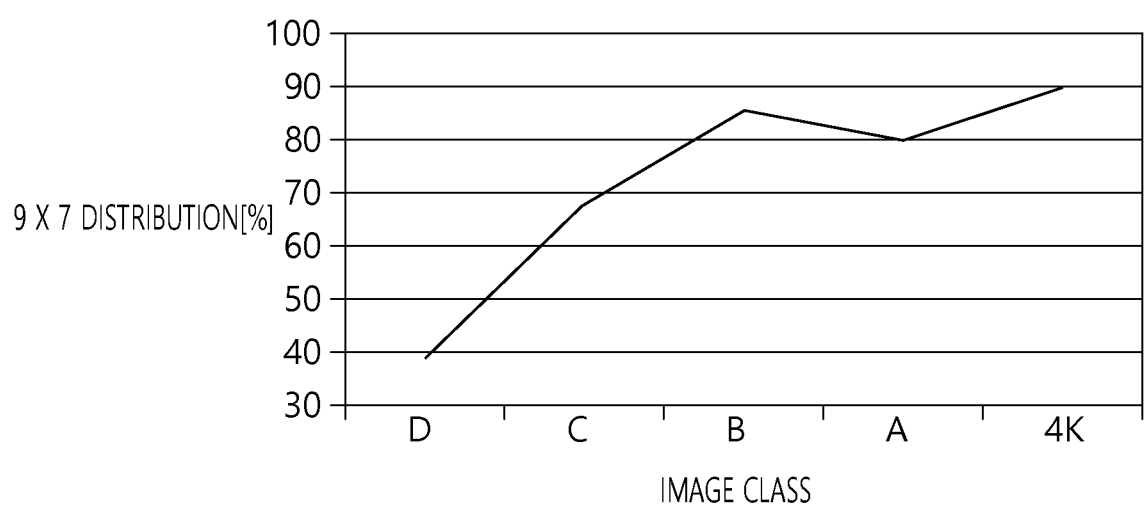
FIG. 14 illustrates an example of a large filter selection ratio according to an image resolution and FIG. 15 illustrates an example of a small filter selection ratio according to the image resolution.
Figure 15:

FIG. 14 illustrates an example of a large filter selection ratio according to an image resolution and FIG. 15 illustrates an example of a small filter selection ratio according to the image resolution. Here, the 9×7 size filter is used as an example of a large filter and the 5×5 size filter is used as an example of a small filter. Referring to FIGS. 14 and 15, the resolution of the image is larger in the order of D, C, B, A, and 4K. 4 K resolution is a term that refers to next-generation high-definition resolution with a horizontal resolution of 4 kilo pixels (kP).

In FIG. 14, it can be seen that the larger filter selection ratio increases as the resolution of the image increases. At the 4 K resolution, the large filter is selected at a ratio of approximately 90%. On the contrary, in FIG. 15, it can be seen that the selection ratio of the small filter decreases as the resolution of the image increases and the smaller filter is hardly selected at the 4 K resolution.

In the present invention, the sizes of the filters included in the filter set may be determined according to the resolution of the image based on a statistical property. That is, when an image having a large resolution is filtered, the number of large filters included in the filter set may be increased and the number of small filters may be decreased. That is, when an image having a small resolution is filtered, the number of large filters included in the filter set may be decreased and the number of small filters may be increased.

In this case, for example, the filter set may be configured based on the image resolution as follows.

TABLE 3

| Image resolution | Filter set |
| --- | --- |
| SD | {3 × 3 filter, 5 × 5 filter, 7 × 7 filter} |
| HD | {7 × 7 filter, 9 × 7 filter, 9 × 9 filter, 11 × 11 filter} |
| 4K | {9 × 9 filter, 11 × 11 filter, 13 × 13 filter} |

As described above, a variable filter set enabled flag may be signaled from the encoder to the decoder to indicate whether the variable filter set is used. Here, the variable filter set enabled flag may be represented by, for example, a Variable_Filter_Set_enabled_flag syntax element. The variable filter set enabled flag may be signaled at the sequence level, the picture level, the slice level, or the like.

When the value of the variable filter set enabled flag is 0, a fixed filter set is used and when the value of the variable filter set enabled flag 1, a flexible filter set may be used.

Meanwhile, as shown in Table 3, the filter set according to the resolution of the image may be defined in advance, but the number and types of filters to be used may be coded and signaled.

In this case, information on the number of filters may be represented by a Num_Filter syntax element and information on the type of the filter may be represented through the filter tap information. The filter tap information may be represented by a Filter_Tap syntax element.

TABLE 4

| Num_Filter | u(v) |
| --- | --- |
| for( i = 0; i < Num_Filter; i++ ) | |
| Filter_Tap[ i ] | u(v) |

Here, the Num_Filter syntax element indicates the number of filters to be used and the Filter_Tap [i] syntax element indicates the filter type of an index i.

Figure 16:
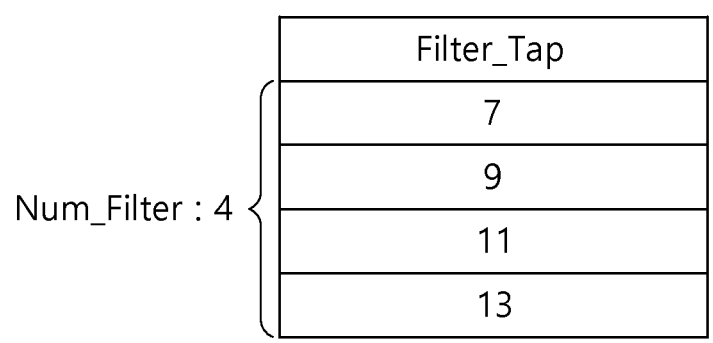
FIG. 16 illustrates an example of the number and types of filters according to the present invention.

FIG. 16 illustrates an example of the number and types of filters according to the present invention.

FIG. 16 illustrates a case where the number of filters is 4 and the filter tap information is 7, 9, 11, and 13, respectively. That is, in the embodiment, Filter_Tap [0] indicates 7, Filter_Tap indicates 9, Filter_Tap [2] indicates 11, and Filter_Tap [3] indicates 13. Here, the filter tap information may indicate the horizontal and vertical size values when the horizontal and vertical sizes of the filters are equal to each other. For example, when the filter tap information indicates 7, the filter tap information may principally represent the 7×7 filter and when the filter tap information indicates 9, the filter tap information may represent the 11×11 filter. This is similarly applied even to the remaining cases. Meanwhile, here, 7, 9, 11, and 13 are examples and besides, an arbitrary positive N value may be used.

Further, in this case, according to the present invention, the shape of the filter may be actively changed according to the image property. For example, when the filter set for an HD image is used, the filter index 0 represents the 7×7 filter according to Table 3 above. However, if the property of the image is large in the horizontal or vertical direction, the filter index may represent the 9×5 filter or 5×9 filter. In this case, since the 7×7 filter, the 9×5 filter, and the 5×9 filter are the same as each other in that the number of filter coefficients required to fill the filter taps is 13, information for additional filter coefficients is not needed even though the filter shapes are changed among the filters.

Thus, flag information for determining whether to actively change the shape of the filter based on the image property may be signaled. For example, the decoder may receive a variable filter shape enabled flag from the encoder. The variable filter shape enabled flag may be represented by a Variable_Filter_Shape_enabled_flag syntax element. It may be represented that when the value of the variable filter shape enabled flag is 0, a fixed filter shape is used and when the value of the variable filter shape enabled flag 1, a flexible filter shape is used.

According to the present invention, filtering can be applied based on image properties for a target block of a restoring picture and an objective/subjective image quality for the restoring picture can be thus enhanced. Further, the filtered restoring picture is stored in a memory to be used as a reference picture for another picture and in this case, inter prediction efficiency can be enhanced.

The above description is only illustrative of the technical idea of the present invention. Therefore, those skilled in the art may make various modifications and variations to the above description without departing from the essential characteristics of the present invention. Accordingly, the embodiments disclosed herein are intended to be illustrative, not limiting, of the present invention. The scope of the present invention is not limited by these embodiments. The scope of protection of the present invention should be construed according to the following claims.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. A restoring picture filtering method performed by a video decoder, comprising:
    calculating an activity of an image of a target region of a restoring picture;
    determining a directivity of the image of the target region;
    selecting a particular filter within a filter set based on the activity and the directivity of the image of the target region; and generating a filtered restoring picture based on the selected filter, wherein a, b, c, d, e, and f represent directivity values of samples of the same row or column in order from a sample on left or top, wherein b, c, d, and e represent directivity values of the samples in the target region, and wherein a and f represent the directivity values of the peripheral samples of the target region, when the target region has a size of 4×4, and wherein the directivity of the image of the target region that has a size of 4×4 is calculated based on a following equation, $$(c+d)*3+(b+e)*2+(a+f).$$

2. The filtering method of claim 1, wherein the determining of the directivity includes:

determining the directivity for a sample based on the sample in the target region and four peripheral samples adjacent to the sample; and determining the directivity for the target region based on the directivity for the sample.

3. The filtering method of claim 2, wherein the directivity for the sample is determined based on a vertical change degree and a horizontal change degree for the sample, and the vertical change degree and the horizontal change degree are calculated based on following equations:

$$\text{Vertical} = |E << 1 - A - B|, \text{ and}$$

$$\text{Horizontal} = |E << 1 - C - D|,$$

wherein Vertical represents the vertical change degree, Horizontal represents the horizontal change degree, E represents a value of the sample, A, B, C, and D represent values of the four peripheral samples, vertical bars || on both sides of the equation represent an absolute value, and << represents an arithmetic left shift.

4. The filtering method of claim 1, wherein the activity of the image for the target region includes horizontal activity and vertical activity.

5. The filtering method of claim 1, wherein the determining of the directivity includes:

determining the directivity for the sample based on the sample in the target region and eight peripheral samples adjacent to the sample; and determining the directivity for the target region based on the directivity for the sample.

6. The filtering method of claim 5, wherein the directivity of the image for the target region indicates one of a horizontal direction, a vertical direction, an upper right diagonal direction, an upper left diagonal direction, and a non-direction.

7. The filtering method of claim 1, wherein a size of the target region is variable.

8. The filtering method of claim 1, further comprising:

receiving a variable region size enabled flag; and receiving region size information when a value of the variable region size enabled flag indicates 1, wherein the size of the target region is determined based on the region size information.

9. The filtering method of claim 8, wherein the region size information is classified into five values of indexes 0 to 4.

10. The filtering method of claim 9, wherein the indexes 0 to 4 are represented as binarization values "0", "100", "101", "110", and "111", respectively.

11. The filtering method of claim 1, further comprising:

receiving a diagonal activity enabled flag, wherein when a value of the diagonal activity enabled flag indicates 1, the directivity of the image for the target region is determined by considering a diagonal direction.

12. The filtering method of claim 1, wherein the filter set is configured based on an image resolution, wherein, based on the image resolution being SD, the filter set includes a 3×3 filter, a 5×5 filter, and a 7×7 filter, wherein, based on the image resolution being HD, the filter set includes the 7×7 filter, a 9×7 filter, a 9×9 filter, and a 11×11 filter, wherein, based on the image resolution being 4K, the filter set includes the 9×9 filter, the 11×11 filter, and a 13×13 filter, and wherein SD represents standard definition, HD represents high definition, and 4K represents 4K ultra high definition.

13. The filtering method of claim 12, further comprising:

receiving a variable filter set enabled flag; and receiving at least one of filter number information and filter tap information when a value of the variable filter set enabled flag indicates 1, wherein the filter set is determined based on at least one of the filter number information and the filter tap information.

14. The filtering method of claim 13, further comprising:

receiving a variable filter shape enabled flag, wherein a case where the value of the variable filter shape enabled flag indicates 0 and a case where the value of the variable filter shape enabled flag indicates 1 are different in shape of the filter indicated by the filter tap information.

* * * * *